United States Patent Office 3,180,810
Patented Apr. 27, 1965

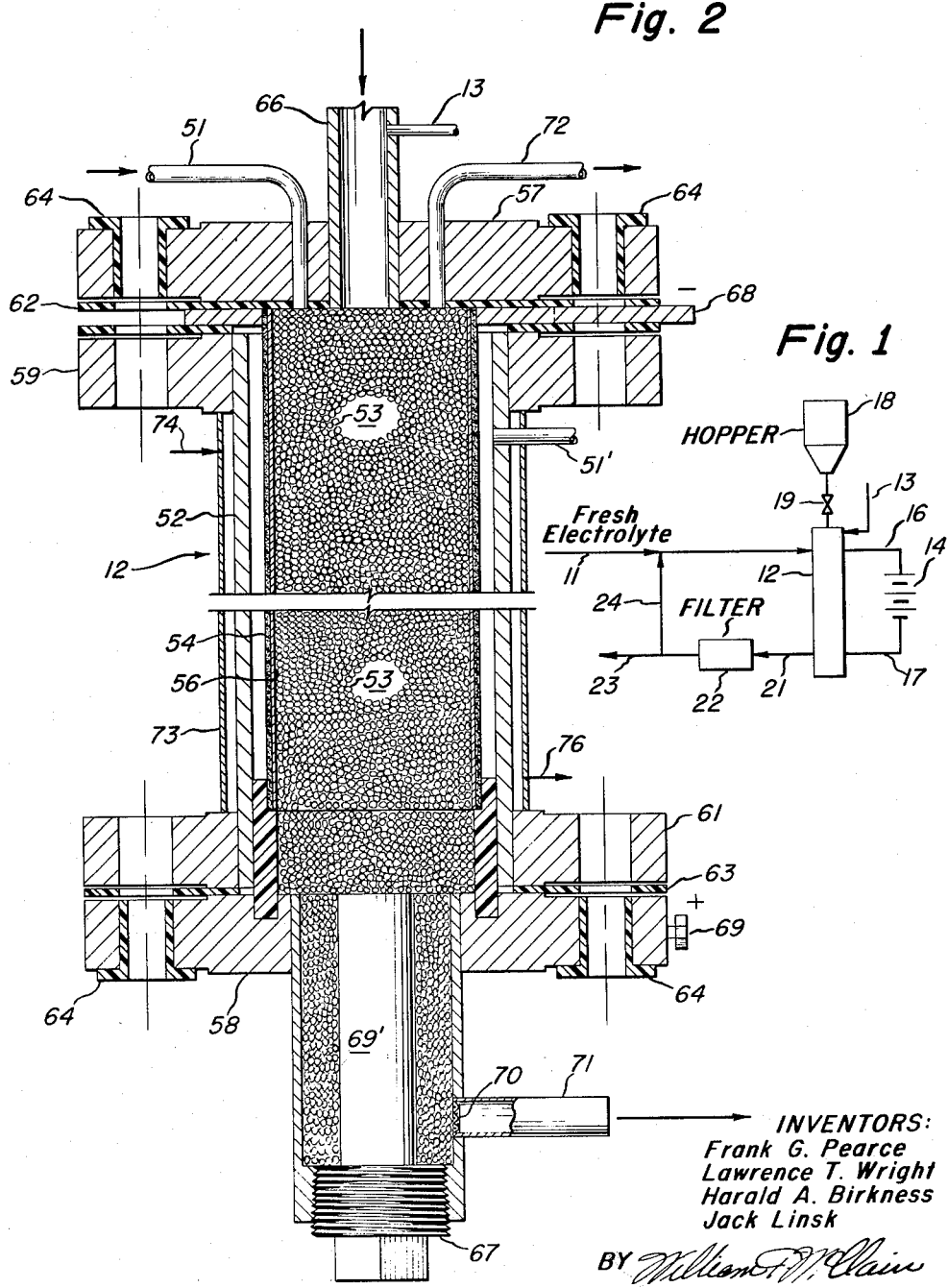

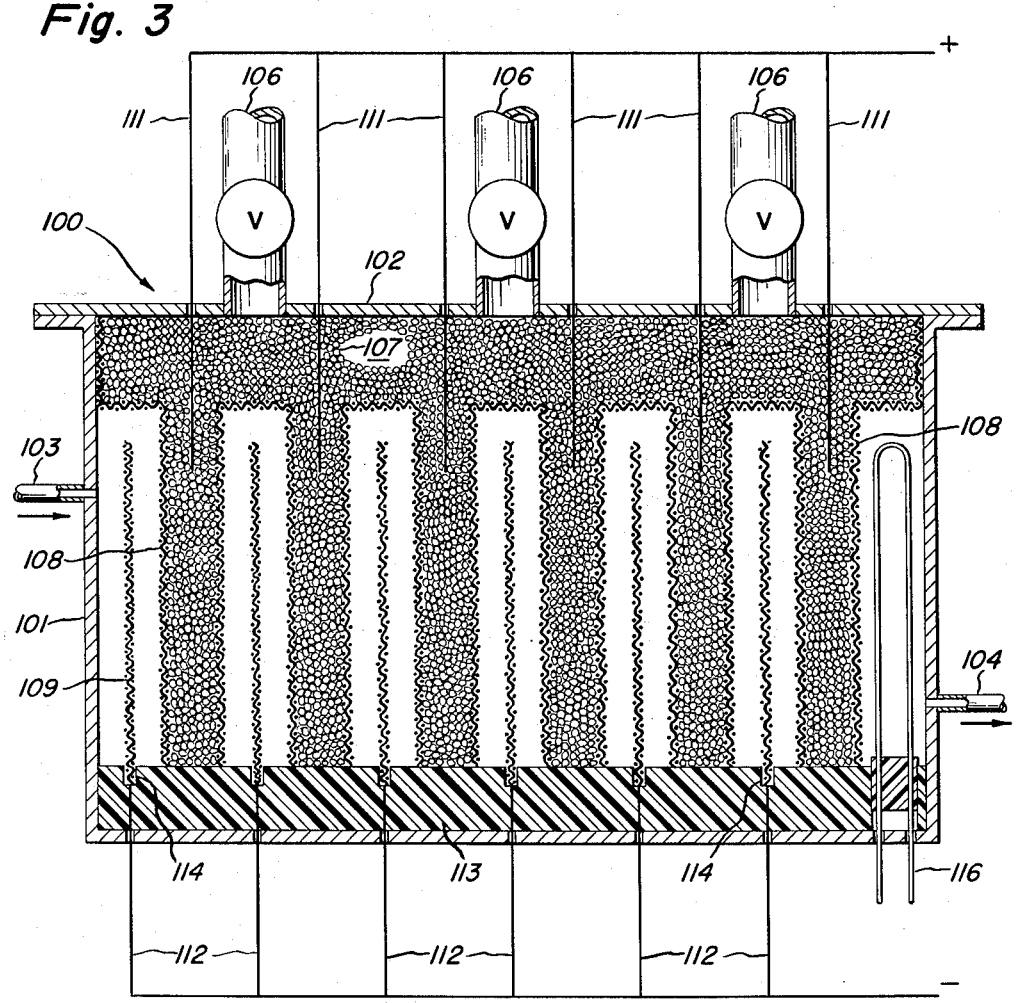

3,180,810
ELECTROLYTIC CELL AND METHOD
OF OPERATION
Frank G. Pearce, Flossmoor, and Lawrence T. Wright
and Harald A. Birkness, Homewood, Ill., and Jack
Linsk, Highland, Ind., assignors to Standard Oil Company, Chicago, Ill., a corporation of Indiana
Filed July 31, 1961, Ser. No. 128,148
14 Claims. (Cl. 204—59)

This invention relates to a method and means for electrolyzing a liquid electrolyte, and more particularly it relates to the manufacture of organometallic compounds by the electroylsis of a liquid electroylte in the presence of a consumable anode. In one aspect, this invention relates to an improved electrolytic cell for the manufacture of tetra-alkyl lead compounds wherein an alkyl Grignard reagent is electrolyzed with a consumable lead anode.

Tetraethyl lead and tetramethyl lead are among the most important organometallic compounds of commerce. It has heretofore been discovered that tetra-alkyl compounds such as these may be prepared by electroylzing an alkyl Grignard reagent, e.g., ethyl or methyl magnesium chloride, using a lead anode. By this procedure, alkyl groups in the Grinard reagent are transferred to a lead anode, forming tetra-alkyl lead and giving magnesium chloride as a by-product. This electrolytic process is superior to a purely chemical process by reason of the low capital required and low material costs.

In the past, electrolytic cells employed for carrying out the above electrolysis, have comprised typically, solid cathode and anode plates providing a space in which an electrolyte is flowed. In another version, a particulate lead anode has been employed with a solid cathode, and the electrolyte is passed into the cell through the anode so as to flow between the two electrodes and parallel to the cathode. In an electrolyte system such as above, it is desirable to maintain a close spacing of the anode and cathode in order to decrease internal resistance and to minimize the power requirements of the operation. However, it has been observed that during the electroylsis a sludge of a very minute particles of solids, predominately lead, tends to form in the liquid electrolyte in the cell and eventually bridges across the electrodes so as to cause the cell to short out. This shorting out reduces the operating cycle of the cell and it is generally necessary to shut down the unit and rid the system of the troublesome particles, as by reloading the cell. Also when employing either of the above-described electrode systems there is a tendency for stagnant or low velocity areas to occur in the cell where the space between the electrodes is filled with relatively low conductivity solution, i.e., electrolyzed Grignard which has a lower electrical conductivity than the bulk of the fluid.

The general object of the present invention is a method and means for conducting the electrolysis of a liquid electrolyte in a more efficient and economical manner. Another object is an electrochemical cell empolying a consumable anode in which the tendency for shorting out is significantly reduced. A further object of the invention is an electrochemical cell which permits the solution passing between the electrodes to be maintained at the same composition as the bulk fluid, so that a more constant and greater electrical conductance is obtained during the electrolysis. Still another object is such an electrolytic cell wherein the temperature difference between the solution in the electrolysis zone and the bulk fluid is minimized. These and other obejcts of the invention will be understood from the following description of the invention.

Briefly, according to the present inveniton, there is provided a method for operating an electrochemical cell in which a liquid electrolyte is electrolyzed with a consumable electrode, as in the electrolysis of an alkyl Grignard reagent with a lead anode to prepare tetra-alkyl lead compounds, which method comprises introducing the liquid electrolyte into a cell; flowing the introduced liquid through and from a first porous electrode to a second porous electrode while electrolyzing the liquid; flowing the electrolyzed liquid through the second electrode and recovering the electrolyzed liquid passed through the second electrode.

In one embodiment, the invention provides an electrolytic cell which comprises liquid electroylte inlet means, spaced-apart liquid permeable electrodes positioned in said cell, means for flowing incoming liquid electrolyte through one of said electrodes to the other of said electrodes and through said other electrode, means for electrolyzing said electroylte between said electrodes, and means for removing electrolyzed solution passed through said other electrode from said cell.

A preferred embodiment of the invention provides an electrolytic cell which comprises a shell member, liquid electrolyte inlet means, a first non-consumable liquid-permeable electrode, a second consumable liquid-permeable electrode, an electrically insulating liquid-permeable membrane positioned between said first and said second electrodes, means for passing liquid electrolyte successively through said first electrode, said membrane and said second electrode, and means for removing liquid passed through said second electrode from said cell. Preferably, a filter is employed to remove solids from the cell effluent and at least a portion of the filtered solution is recycled to the electrolytic cell.

The present invention will be more fully understood by reference to the following description of the electrolysis of an alkyl Grignard electrolyte to form tetra-alkyl lead compounds and to the accompanying drawings which are illustrative of a preferred embodiment of an electrolytic cell employed in the invention, and wherein:

FIGURE 1 is a schematic diagram illustrating a typical electrolytic cell system and the flow arrangement;

FIGURE 2 is a detailed cross-sectional view of an arrangement of the anode and cathode in an electrolytic cell employing a tubular metal cathode and a permeable inert membrane; and, FIGURE 3 illustrates a basket-type cell according to the concept of the invention.

In the preparation of the electrolyte to be electrolyzed the alkyl Grignard reagent is chosen to provide the desired tetra-alkyl lead compound. For example, an ethyl Grignard will afford tetraethyl lead while a methyl Grignard will produce tetramethyl lead. Alkyl lead compounds having from about 1 to about 4 carbon atoms per alkyl group are most effectively produced by the electrolytic process. By employing mixed Grignard reagents, such as a mixture of ethyl Grignard and methyl Grignard, a mixed tetra-alkyl compound may be prepared, e.g., dimethyl diethyl lead may be obtained. The halide portion of the alkyl Grignard may be the chloride, bromide, or, less desirably, the iodide. Grignard reagents are well-known and no discussion of their preparation is necessary to describe the present invention.

The electrolyte also comprises dialkyl ethers of ethylene glycols having at least 2 carbon atoms in each alkyl group and not more than 2 ethylene groups in the glycol portion. Thus, the ethers have a formula of $$R-O-(C_2H_4-O)_n-R$$

where the R's are the same or different alkyl groups each having at least 2 and suitably up to 12 carbon atoms per group, and where $n$ is either 1 or 2. Ethers outside the foregoing definition tend to form a magnesium etherate which precipitates from the electrolyte, thereby fouling equipment, or, they may have undesirable physical properties, i.e., boiling point or they may be water miscible so that recovery is difficult. Examples of suitable ethers for use herein are the "Carbitols" (trademark), wherein $n$ is 2 and the "Cellosolves" (trademark), wherein $n$ is 1. Specific ethers are diethyl Cellosolve, dibutyl Cellosolve, diethyl Carbitol, dibutyl Carbitol, and ethyl hexyl Carbitol, all of which are commercially available. For optimum results enough ether should be employed in the electrolyte so that approximately 1 molecule of ether is available for each molecule of magnesium chloride formed in the electrolysis. However, it is desirable to keep to a minimum, consistent with good operation, the amount of ether employed in the solvent mixture, and amounts as low as about 30 weight percent may be employed, depending upon the concentration of the Grignard solution.

An excess of alkyl halide in the electrolyte is maintained and alkyl halide concentration of about 1 to 50 weight percent of the total electrolyte are maintained. Ordinarily, the alkyl halide will correspond to the alkyl Grignard reagent, i.e., ethyl chloride is normally used with ethyl magnesium chloride and methyl chloride is normally used with methyl magnesium chloride. However, these alkyl groups need not correspond. Advantageously, tetrahydrofuran is employed in the electrolyte in amounts from about 2 to 60 percent by weight and also an aromatic hydrocarbon, preferably benzene in an amount between about 2 to 50 weight percent is incorporated in the electrolyte to increase electrolyte conductivity and prevent undesirable increases in viscosity during the electrolysis.

Conditions in a typical electrolytic cell advantageously include a temperature within the range of about 20° C. to 100° C., preferably 20° C. to 50° C., optimally about 25° C. to 45° C. A current density within the range of about 0.2 ampere to 30 per square foot at 30 volts is employed. Lower voltages of about 20 to 30 volts are preferred; however, up to 50 volts or higher may be employed. Cell pressures may range from atmospheric to superatmospheric, say 60 p.s.i.g., but preferably are lower, i.e., less than about 30 p.s.i.g. Initial alkyl Grignard concentrations are advantageously within the range of about 1 to 3.5 normal, and the electrolysis is carried out in the presence of excess alkyl halide until the Grignard concentrations drops below about 0.1 N.

Referring to FIGURE 1, the prepared electrolyte is introduced by way of line 11 into the electrolytic cell 12 and an excess alkyl halide is maintained by adding the alkyl halide to the cell via line 13. The electrolyte in the cell is electrolyzed by passing an electric current from electrical source 14 through electrical leads 16 and 17 to the cell electrodes between which the electrolyte is passed. When particulate lead, such as lead pellets, shot or turnings is employed as the consumable anode the desired level of lead in the cell may be maintained by feeding the particulate lead from a hopper 18 via line 19 into the cell. Electrolyzed solution is withdrawn from the cell via line 21 and preferably solids are removed from the cell effluent by centrifuging, filtering or other suitable means. Advantageously, filter 22 is employed for this purpose and the reactor effluent may be passed via line 23 from the cell or it may be recycled to the electrolysis via line 24.

Turning now to FIGURE 2, there is illustrated a tubular electrolytic cell which comprises an electrolyte inlet 51 through which electrolyte is passed into the elctrolytic cell 12 which is constructed of an outer tubular shell 52, a next inner porous electrode member 54 spaced apart from a second electrode member 53 and preferably provided with a porous insulating membrane 56 so as to electrically insulate electrode 53 and electrode 54 during operation of the cell.

The electrolytic cell may be of any appropriate size commensurate with the desired production output and typically, may vary from 2 to 10 inches in diameter with a length ranging from about 1 to 20 feet. The outer shell 52 can be of any appropriate design suitable for cell operating temperature and pressure, and preferably is a fluid-retaining tubular steel member provided with an upper head 57 and a lower head 58 which are removable to permit assembly and disassembly of the cell elements. Advantageously, heads 57 and 58 are attached to the shell by flanged connections 59 and 61 using inert insulating gaskets 62 and 63 of a material such as nylon or Teflon. Insulating sleeves 64 are inserted in the bolt holes of the flanges to insure electrical insulation of the components.

Electrode 54, which in this embodiment of the invention, serves as the cathode is constructed of a liquid-permeable electrically conducting material which is compatible with the electrolyte in service and is essentially non-reactive with the electrolyte during the electrolysis. Materials employed in the cathode can be various grades of steel, such as carbon steel, austenitic or ferritic stainless steel, copper, brass, or the like. The cathode may be built of a sintered porous metal such as commercially available "micro-metallic" tubing, expanded metal, mesh or screen and has openings varying from a few microns up to 1/8 inch or more so as to permit liquid electrolyte to flow through it and provide a large cathode surface area.

Electrode 53 is a consumable liquid-permeable anode constructed of a material such as high purity lead. Preferably particulate lead is employed as the anode, although other porous forms thereof may also be used. As the lead is consumed during the electrolysis, the desired quantity of lead in the cell may be maintained by continuously or periodically adding lead pellets, as through the opening 66 in the top head 57 so that lead is fed to the interior of the electrolytic cell. Advantageously, the bottom head 58 is provided with an opening 67 near the bottom thereof to permit removal of the lead when it is necessary to dismantle and clean out the cell.

As previously mentioned it is desirable to maintain as close a spacing as possible between the anode 53 and cathode 54 in order to reduce the power requirements for the process. However, it is necessary to have the electrodes spaced apart so as to prevent direct contact with one another and consequent shorting out of the cell. Normally, the spacing ranges from about 1/16 inch to 1/2 inch. It has been found advantageous to employ a liquid-permeable insulating membrane member 56 between the cathode 54 and the anode 53. A porous insulating type material which is compatible and non-reactive with the electrolyte during service is employed for this purpose. Suitable materials are screen or mesh made of polyethylene, polypropylene, Teflon (tetrafluoroethylene) resins or ceramic materials, typically, polypropylene cloth having 32 x 32 threads per inch. The insulating membrane 56 may be separate or integral with the electrodes as desired.

Electrical contacts 68 and 69 are electrically connected to the cathode 54 and the anode 53, respectively, and provide connections to the external power source used to electrolyze the solution in the cell. Probe 69' can be employed to increase the electrical contact with the lead particles.

In the operation of the electrolytic cell, electrolyte is introduced into the cell to provide a flow rate ranging from about 2 to 50 linear feet per second. Normally, the bulk of the electrolyte flow is through the inlet 51, and the amount of electrolyte put through the inlet 51' may be varied to achieve the desired flow pattern in the cell. A substantial portion of the electrolyte flows under pressure into the annulus between the shell 52 and electrode 54 and flows under pressure through and from cathode 54 to anode 53 while an electric current is passed from the anode to the cathode through the electrolyte so as to electrolyze the electrolyte. The electrolyzed solution then flows through the anode 53 through screen 70, and to the electrolyte outlet 71 and from the cell. In this manner solid particles of lead which may be sloughed off the anode or which may otherwise be present in the electrolyte are prevented from building up at the cathode and are returned by the flow to the anode so that they may be consumed during the electrolysis. Similarly, when the membrane 56 is employed this manner of flow prevents a build up of such particles in the membrane. An additional benefit resulting from this manner of operation is that concentration and temperature differentials between the electrolyte occupying the space between the electrodes at a given time and the bulk fluid is minimized at a given flow rate, so that at suitable rates of flow there is an increased operational efficiency of the process.

While the apparatus of FIGURE 2 employs the so-called "downflow" technique with the electrolyte inlet at the top of the cell and the outlet at the bottom, an "upflow" arrangement may be provided whereby the electrolyte is introduced near the bottom of the cell so as to flow upwardly and out of the cell.

Provision may also be made for adding and maintaining excess alkyl halide in the electrolyte during the electrolysis by introducing an alkyl halide via line 13 into the cell or into the external piping leading to the cell. A gas vent 72 preferably is employed to remove gases formed during the electrolysis and to prevent undue pressure build-up during operation.

Means are provided for maintaining the above-described cell at the desired temperature during the electrolysis. Typically, a coolant, such as water, is introduced into an exterior coolant jacket 73 via line 74 and is removed by way of line 76.

FIGURE 3 illustrates an alternate design of an electrochemical cell 100 according to the concept of the present invention, wherein the shell member, advantageously in a rectangular box 101, provided with a top head 102, an electrolyte inlet 103 and an electrolyte outlet 104. Valved openings 106 are provided in the top head for lead particle additions. The lead particles 107 serve as anodes and are contained in anode baskets 108 constructed of a porous, inert, insulating material, such as metal screening coated with an integral membrane of tetrafluoroethylene, epoxy resin, porcelain, or other insulating material. Lead shot is placed in the anode baskets, and porous inert cathodes 109, of a material such as flat stainless steel wire screen are positioned between the anode baskets and closely spaced from the anodes at a typical distance of about ⅛" to ½". Electrical connections to an external power source are provided by leads 111 and 112 from the anodes and cathodes, respectively.

The anode baskets 108 preferably are supported on an insulating supporting member 113 in the bottom of the box, and the screen cathodes 109 are supported by insulating channels 114 in the bottom and/or sides of the box. The supporting member and channels typically are of inert materials such as Teflon (tetrafluoroethylene), polyethylene, Delrin (acetal) resins.

Electrolyte introduced into the cell 100 via inlet 103 flows through the cathodes 109, to and through the anodes 107 in a direction generally perpendicular to the electrodes, and is removed from the cell by way of outlet 104. A cooling coil 116 can be utilized to maintain the desired operating temperature in the cell, or a slipstream can be taken from the cell, cooled and returned to the cell.

Thus, it is apparent from the foregoing description of the invention that there is provided an improved method and means for carrying out an electrolytic reaction of the type described above so as to reduce the tendency for sludge formed during the electrolysis to short out the cell, and to permit increased on-stream time in operating a process as herein described. It will be understood that the above-described electrolytic cell and method of operation is given for the purpose of exemplification, and does not in any way serve to limit the scope of the present invention. Variations and modifications in operation and construction will become apparent to the skilled artisan, and as such, fall within the spirit and scope of the present invention.

What is claimed is:

1. The method of operating an electrochemical cell in which a liquid electrolyte is electrolyzed with a consumable electrode which method comprises introducing said liquid electrolyte into said cell; passing said introduced electrolyte through a porous, essentially non-reactive cathode; passing the resulting electrolyte from said cathode to a porous consumable anode; electrolyzing the electrolyte being passed through and from said cathode to said anode; passing the resulting electrolyzed liquid through said anode; and recovering said electrolyzed liquid passed through said second electrode.

2. In the manufacture of tetra-alkyl lead compounds wherein an electrolyte comprising an alkyl Grignard reagent is electrolyzed with a lead anode, the method which comprises introducing said electrolyte into said cell; flowing said electrolyte in said cell through and from a porous cathode to a porous lead anode while electrolyzing said electrolyte; flowing the resulting electrolyzed electrolyte through said anode; and recovering said electrolyzed electrolyte passed through said anode.

3. The method of claim 2 wherein said anode is particulate lead.

4. The process of claim 3 wherein said electrolyte is successively passed through said porous cathode, a porous insulating membrane and said porous lead anode.

5. The method of claim 2 wherein at least a portion of said recovered electrolyte is filtered and recycled to said electrolysis.

6. An electrolytic cell which comprises liquid electrolyte inlet means, a first non-consumable liquid-permeable electrode, a second consumable liquid-permeable metal electrode spaced apart from said first electrode, means for passing liquid electrolyte through said first electrode to said second electrode and through said second electrode, means for electrolyzing said electrolyte between said electrodes, and means for removing liquid passed through said second electrode from said cell.

7. The cell of claim 6 wherein said second electrode is a particulate metal.

8. The cell of claim 7 wherein a liquid-permeable insulating membrane is positioned between said first and said second electrodes.

9. The cell of claim 7 including means for removing solids from liquid passed through said second electrode.

10. The cell of claim 9 including means for recycling at least a portion of the resulting solid-free liquid to the space between said electrodes.

11. An electrolytic cell system which comprises a shell member, a liquid electrolyte inlet near the top of said shell, at least one non-consumable liquid-permeable cathode positioned inside said shell and in flow-communication with said inlet, at least one consumable particulate metal anode in flow-communication with said cathode, a porous insulating membrane positioned between said anode and said cathode, a liquid electrolyte outlet near the bottom of said cell and in flow-communication with said anode, means for electrolyzing said electrolyte between said anode and said cathode means for passing liquid electrolyte from said inlet successively through said cathode, said membrane and said anode to said outlet.

12. The cell of claim 11 wherein said shell member is a tubular member, said cathode is a porous inert tubular member positioned inside said shell, said membrane is a separate porous tubular member positioned inside said cathode, and said anode is lead.

13. The cell of claim 11 wherein a plurality of anodes and cathodes are employed and wherein said shell member is a box-like member, said anodes are particles of lead contained in porous anode baskets, said cathodes are planar, porous elements interposed said anodes and said membrane integral with said baskets.

14. The cell of claim 11 wherein said cell includes means for removing solids from the effluent from said cell and means for recycling the resulting solid-free effluent to said cell.

References Cited by the Examiner

UNITED STATES PATENTS

| | | | |
|---|---|---|---|
| 2,944,948 | 7/60 | Giraitis | 204—59 |
| 2,944,956 | 7/60 | Blue et al. | 204—266 |
| 2,987,463 | 6/61 | Baker et al. | 204—266 |
| 3,007,857 | 11/61 | Braithwaite | 204—59 |
| 3,007,858 | 11/61 | Braithwaite | 204—59 |
| 3,141,841 | 7/64 | Braithwaite et al. | 204—59 |

FOREIGN PATENTS 614,688  2/61  Canada.

JOHN H. MACK, *Primary Examiner.*

JOHN R. SPECK, *Examiner.*